US011783579B2

(12) United States Patent
Du et al.

(10) Patent No.: US 11,783,579 B2
(45) Date of Patent: Oct. 10, 2023

(54) HYPERSPECTRAL REMOTE SENSING IMAGE CLASSIFICATION METHOD BASED ON SELF-ATTENTION CONTEXT NETWORK

(71) Applicant: WUHAN UNIVERSITY, Hubei (CN)

(72) Inventors: Bo Du, Hubei (CN); Yonghao Xu, Hubei (CN); Liangpei Zhang, Hubei (CN)

(73) Assignee: WUHAN UNIVERSITY, Hubei (CN)

( * ) Notice: Subject to any disclaimer, the term of this patent is extended or adjusted under 35 U.S.C. 154(b) by 0 days.

(21) Appl. No.: 18/192,657

(22) Filed: Mar. 30, 2023

(65) Prior Publication Data

US 2023/0260279 A1    Aug. 17, 2023

Related U.S. Application Data

(63) Continuation-in-part of application No. PCT/CN2021/121774, filed on Sep. 29, 2021.

(30) Foreign Application Priority Data

Oct. 7, 2020  (CN) .......................... 202011067782.2

(51) Int. Cl.
    *G06V 20/10*    (2022.01)
    *G06V 10/77*    (2022.01)
    (Continued)

(52) U.S. Cl.
    CPC .......... *G06V 20/194* (2022.01); *G06V 10/764* (2022.01); *G06V 10/77* (2022.01); *G06V 10/82* (2022.01)

(58) Field of Classification Search
    CPC ...... G06V 20/194; G06V 10/77; G06V 10/82; G06V 10/764
    See application file for complete search history.

(56) References Cited

U.S. PATENT DOCUMENTS

| 2018/0260657 A1 | 9/2018 | Jia et al. |
| 2020/0175015 A1 | 6/2020 | Al Hasan et al. |

(Continued)

FOREIGN PATENT DOCUMENTS

| CN | 106485238 | 3/2017 |
| CN | 109376804 | 2/2019 |

(Continued)

OTHER PUBLICATIONS

Ramachandran, Prajit, et al. "Stand-alone self-attention in vision models." Advances in neural information processing systems 32 (2019). (Year: 2019).*

(Continued)

*Primary Examiner* — Utpal D Shah
(74) *Attorney, Agent, or Firm* — JCIP GLOBAL INC.

(57) ABSTRACT

A hyperspectral remote sensing image classification method based on a self-attention context network is provided. The method constructs a spatial dependency between pixels in a hyperspectral remote sensing image by self-attention learning and context encoding, and learns global context features. For adversarial attacks in the hyperspectral remote sensing data, the proposed method has higher security and reliability to better meet the requirements of safe, reliable, and high-precision object recognition in Earth observation.

5 Claims, 2 Drawing Sheets

(51) Int. Cl.
  *G06V 10/82* (2022.01)
  *G06V 10/764* (2022.01)

(56) References Cited

U.S. PATENT DOCUMENTS

| | | | | |
|---|---|---|---|---|
| 2021/0390410 | A1* | 12/2021 | Vaswani | G06N 3/08 |
| 2022/0108478 | A1* | 4/2022 | Houlsby | G06F 18/24 |
| 2022/0233160 | A1* | 7/2022 | Cao | G06V 10/40 |
| 2022/0277038 | A1* | 9/2022 | Li | G06V 10/454 |
| 2022/0301310 | A1* | 9/2022 | Kim | G06V 10/82 |
| 2022/0301311 | A1* | 9/2022 | Abati | G06V 10/761 |
| 2022/0383639 | A1* | 12/2022 | Javan Roshtkhari | G06V 40/23 |

FOREIGN PATENT DOCUMENTS

| | | |
|---|---|---|
| CN | 110532353 | 12/2019 |
| CN | 110688491 | 1/2020 |
| CN | 110969010 | 4/2020 |
| CN | 111274869 | 6/2020 |
| CN | 111368896 | 7/2020 |
| CN | 111582225 | 8/2020 |
| CN | 111738124 | 10/2020 |
| CN | 12287978 | 1/2021 |
| WO | 2020097461 | 5/2020 |

OTHER PUBLICATIONS

Wu, Honglin, et al. "Self-attention network with joint loss for remote sensing image scene classification." IEEE Access 8 (2020): 210347-210359. (Year: 2020).*

Zhao, Wenzhi, et al. "Sample generation with self-attention generative adversarial adaptation network (SaGAAN) for hyperspectral image classification." Remote Sensing 12.5 (2020): 843. (Year: 2020).*

Bo Fang, "Adversarial Learning for Image Classification and Change Detection Using Optical Remote Sensing Images", with English translation thereof, Thesis of PhD, Wuhan University, Nov. 2019, pp. 1-262.

Baosong Yang et al., "Context-Aware Self-Attention Networks", Neurocomputing, vol. 458, Oct. 11, 2021, pp. 1-9.

"International Search Report (Form PCT/ISA/210) of PCT/CN2021/121774," with English translation thereof, dated Jan. 6, 2022, pp. 1-4.

"Written Opinion of the International Searching Authority (Form PCT/ISA/237) of PCT/ CN2021/121774," dated Jan. 6, 2022, pp. 1-4.

* cited by examiner

HYPERSPECTRAL REMOTE SENSING IMAGE CLASSIFICATION METHOD BASED ON SELF-ATTENTION CONTEXT NETWORK

CROSS-REFERENCE TO RELATED APPLICATION

This application is a continuation-in-part of international application of PCT application serial no. PCT/CN2021/121774 filed on Sep. 29, 2021, which claims the priority benefit of China application no. 202011067782.2 filed on Oct. 7, 2020. The entirety of each of the above mentioned patent applications is hereby incorporated by reference herein and made a part of this specification.

BACKGROUND

Technical Field

This invention belongs to the technical field of image processing, and relates to a remote sensing image classification method, in particular to a hyperspectral remote sensing image classification method based on a self-attention context network.

Description of Related Art

Hyperspectral remote sensing can simultaneously obtain continuous Earth observation data in both spatial and spectral dimensions by combining spectral technology and imaging technology. Compared with natural images, hyperspectral remote sensing images have higher spectral resolution and more bands, which can reflect more abundant spectral characteristics of ground objects. Therefore, using hyperspectral remote sensing images to classify and identify ground objects is one of the important ways to realize Earth observation.

At present, most hyperspectral remote sensing image classification methods are based on deep convolutional neural networks and have achieved good ground object recognition results. However, with the rapid development of the research on adversarial attack algorithms in the field of computer vision, the existing deep neural networks are found to be extremely vulnerable to the attack of adversarial examples. Such adversarial examples can mislead the deep neural networks to make wrong predictions, although they may look identical to clean samples for the human visual system. Currently, there is no specific research related to adversarial attacks in the field of hyperspectral remote sensing. Since the existing hyperspectral remote sensing image classification methods based on deep neural networks have not fully considered the security and reliability of the model, these methods are very vulnerable to adversarial attacks. Thus, there is an urgent need for an advanced hyperspectral remote sensing image classification algorithm with higher security and reliability to better meet the requirements of safe, reliable, and high-precision object recognition in Earth observation.

SUMMARY

In order to solve the above technical problems, this invention provides a hyperspectral remote sensing image classification method based on a self-attention context network, which includes constructing an overall network, wherein the overall network includes a backbone network, a self-attention module, and a context encoding module. First, extracting hierarchical features through three 3×3 dilated convolutional layers and one 2×2 average pooling layer by the backbone network. Subsequently, inputting the features extracted by the backbone network to the self-attention module to perform self-attention learning, and constructing the spatial dependency between pixels to obtain self-attention feature. Then, inputting this feature to the context encoding module to learn global context features. In the classification stage, the present method fuses the global context features with convolutional features in the first two convolutional layers to achieve the recognition of ground objects with different sizes.

The technical solution of the present invention is: First, constructing the overall network, including a backbone network, a self-attention module, and a context encoding module. Extracting hierarchical features through three dilated convolutional layers and an average pooling layer by the backbone network. Then, inputting the features extracted by the backbone network to the self-attention module for self-attention learning, and constructing the spatial dependency between pixels to obtain the self-attention feature. Finally, inputting the self-attention feature to the context encoding module to learn the global context features.

The detailed implementation includes the following steps:

Step 1: Initializing the parameters in the overall network so that the parameters satisfy a Gaussian distribution with a mean of 0 and a variance of 0.1;

Step 2: Denoting the original hyperspectral remote sensing image as $X \in R^{h \times w \times c}$ wherein h, w, and c are the height, width, and number of bands of the original hyperspectral remote sensing image, respectively. Inputting X into the backbone network;

Step 3: Inputting the feature $C_3$ of the third dilated convolutional layer to the self-attention module to learn the self-attention feature $$S \in R^{\frac{h}{2} \times \frac{w}{2} \times m},$$

wherein m is the number of convolutional kernels in the first dilated convolutional layer;

Step 4: Inputting the self-attention feature S learned by the self-attention module to the context encoding module to learn context features $$Z \in R^{\frac{h}{2} \times \frac{w}{2} \times m};$$

Step 5: Concatenating the context feature Z with the first convolutional feature and the second convolutional feature for a feature fusion, and obtaining fused features $H = [C_1; C_2; U(Z)] \in R^{h \times w \times 3}$, wherein $U(\cdot)$ represents the bilinear interpolation with an upsampling rate of 2, $C_1$, and $C_2$ are features of the first dilated convolutional layer and the second dilated convolutional layer, respectively;

Step 6: Inputting the fused feature H into a 1×1 convolutional layer, and using the Softmax function to obtain the probability map $\hat{Y}$ predicted by the overall network. Calculating the cross-entropy loss function between the predicted probability map $\hat{Y}$ and the ground-truth label Y;

Step 7: Using the gradient descent algorithm to optimize the loss function in step 6;

Step 8: Repeating the above steps 2-7 until the network converges;

Step 9: Inputting the target image into the trained overall network to complete the hyperspectral remote sensing image classification task.

More specifically, the detailed learning process of the self-attention feature S described in step 3 includes the following sub-steps:

Step 3.1: To reduce the computational burden in the self-attention feature learning process, using an 2×2 average pooling layer to halve the spatial size of the inputted feature of the third dilated convolutional layer:

$$P_2 = P_{avg}(C_3) \in R^{\frac{h}{4} \times \frac{w}{4} \times m},$$

wherein $P_{avg}(\cdot)$ denotes the average pooling operation;

Step 3.2: Inputting $P_2$ into three convolutional layers with n convolutional kernels to obtain the corresponding feature maps $$\{\alpha, \beta, \gamma\} \in R^{\frac{h}{4} \times \frac{w}{4} \times n};$$

Step 3.3: Resizing $$\alpha, \beta, \gamma \text{ to } R^{\frac{hw}{16} \times n},$$

and using the following formula to calculate the spatial attention map $$A \in R^{\frac{hw}{16} \times \frac{hw}{16}}:$$

$$A_{(i,j)} = \frac{\exp(\alpha_i \times \beta_j^T)}{\sum_{k=1}^{\frac{hw}{16}} \exp(\alpha_k \times \beta_j^T)},$$

wherein $A_{(i,j)}$ represents the influence of pixel i on pixel j in the original hyperspectral remote sensing image, k=1,2, . . . , hw/16;

Step 3.4: Performing matrix multiplication on the spatial attention map A and the feature map γ to obtain the feature map B=A×γ, and then resizing B to $$R^{\frac{h}{4} \times \frac{w}{4} \times n};$$

Step 3.5: Computing the final self-attention feature $$S \in R^{\frac{h}{2} \times \frac{w}{2} \times m}$$

enhanced by the self-attention module via:

$$S = F(U(B)) + C_3,$$

wherein $F(\cdot)$ represents a nonlinear mapping function, which is implemented by a convolutional layer with m convolutional kernels, and $U(\cdot)$ represents the bilinear interpolation with an upsampling rate of 2, and $U(\cdot)$ represents the bilinear interpolation with an upsampling rate of 2.

More specifically, the detailed learning process of the context features Z described in step 4 includes the following sub-steps:

Step 4.1: Reducing the dimensionality of the inputted self-attention feature S with a 1×1 convolutional layer with n convolutional kernels, and resizing the obtained feature map Q to $$R^{\frac{hw}{4} \times n}.$$

Denoting $q_i \in R^n$ as the i-th element in Q, wherein i=1, 2, . . . N, $$N = \frac{hw}{4};$$

Step 4.2: Denoting $D=\{d_j\}_{j=1}^{k}$ as the coding dictionary that learns the visual center using the global statistical information in Q, wherein $d_j \in R^n$ represents the j-th element in the dictionary, and k is the number of elements in the dictionary. Calculating the standardized residual between Q and D via:

$$e_{ij} = \frac{\exp(-s_j \|r_{ij}\|^2)}{\sum_{l=1}^{k} \exp(-s_l \|r_{il}\|^2)} r_{ij},$$

wherein $r_{ij} = q_i = q_i - d_j$ represents the residual between the i-th element in Q and the j-th element in D, $s_j$ represents the scaling factor corresponding to the j-th element in D, and $s_l$ represents the scaling factor corresponding to a l-th element in D;

Step 4.3: Calculating the global context vector $$e = \sum_{j=1}^{k} N\left(\sum_{i=1}^{N} e_{ij}\right) \in R^n,$$

wherein $N(\cdot)$ represents the batch normalization operation;

Step 4.4: Using a fully connected layer to upscale the global context vector e to $R^m$:

$$\hat{e} = \sigma(W_{fc} e + b_{fc}),$$

wherein $$\sigma(x) = \frac{1}{1 + \exp(-x)}$$

is the sigmoid function, $W_{fc}$ and $b_{fc}$ are the weight matrix and the bias vector in the fully connected layer, respectively;

Step 4.5: Computing the final context features $$Z \in R^{\frac{h}{2} \times \frac{w}{2} \times m}:$$

$$Z = S \odot (\hat{e}+1),$$

wherein $\odot$ represents the element-wise multiplication on the channel dimension.

More specifically, the detailed implementation of inputting X into the backbone network in step 2 is as follows:

Inputting X into the first dilated convolutional layer with m3×3 convolutional kernels, and calculating features $C_1=g(W_1*X+b_1)$ of the first dilated convolutional layer, wherein $W_1$, $b_1$ are the weight matrix and bias vector in the first dilated convolutional layer, respectively, $g(x)=\max(0, x)$ is the rectified linear unit function. Similarly, the features of the second dilated convolutional layer and third dilated convolutional layer are expressed as $C_2=g(W_2*C_1+b_2)$ and $C_3=g(W_3*P_1+b_3)$, wherein $P_1=P_{avg}(C_2)$ is the feature of the first pooling layer, and $P_{avg}(\cdot)$ is the 2×2 average pooling operation.

More specifically, the detailed expression of the cross-entropy loss function in step 6 is as follows:

$$L\underset{cls}{s} = -\frac{1}{hw}\sum_{i=1}^{h}\sum_{j=1}^{w}\sum_{k=1}^{v} Y_{(i,j,k)}\log(\hat{Y}_{(i,j,k)}),$$

wherein v is the total number of categories, $\hat{Y}$ is the predicted probability map, and Y is the ground-truth label, wherein h and w are the height and width of the original hyperspectral remote sensing image, respectively.

The beneficial effects of the present invention are:

This invention proposes a hyperspectral remote sensing image classification method based on a self-attention context network, which can effectively improve the model's resistance ability to adversarial examples. Compared with the existing hyperspectral remote sensing image classification methods based on deep convolutional neural networks, this invention uses self-attention learning and context encoding to construct the spatial dependency between pixels in hyperspectral remote sensing images by extracting global context features. Thus, it can maintain superior hyperspectral remote sensing image classification accuracy against adversarial attacks.

DESCRIPTION OF THE EMBODIMENTS

Figure 1:
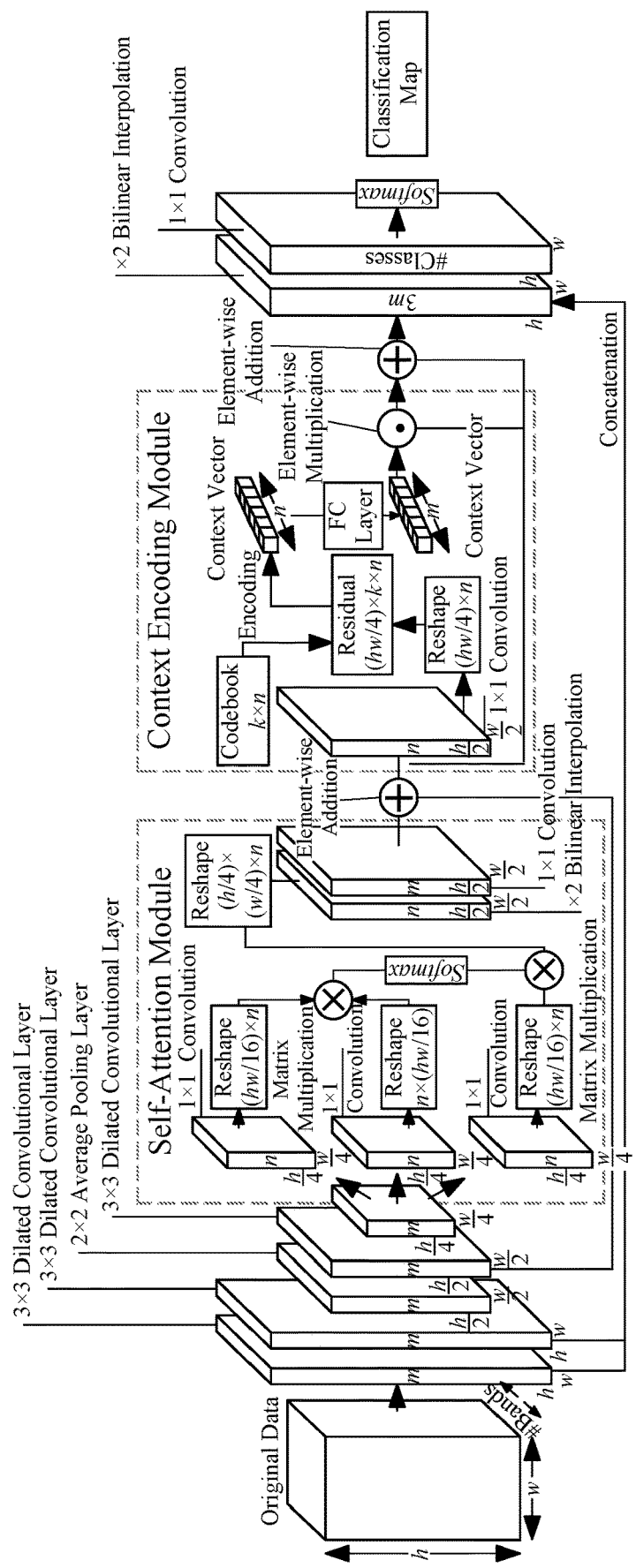
FIG. 1 is a schematic diagram of a hyperspectral remote sensing image classification method based on a self-attention context network proposed by the present invention.

In order to facilitate those of ordinary skill in the related research fields to understand and implement the present invention, the details of the present invention will be described below in conjunction with the drawings and embodiments. It should be understood that the implementation examples described here are only for illustration and explanation of the present invention, and are not intended to limit this invention.

This invention provides a hyperspectral remote sensing image classification method based on a self-attention context network, which includes constructing an overall network, wherein the overall network includes a backbone network, a self-attention module, and a context encoding module. First, extracting hierarchical features through three 3×3 dilated convolutional layers and one 2×2 average pooling layer by the backbone network. Subsequently, inputting the features extracted by the backbone network to the self-attention module to perform self-attention learning, and constructing the spatial dependency between pixels to obtain self-attention features. Then, inputting this feature to the context encoding module to learn global context features. In the classification stage, considering the need of recognizing ground objects with different sizes, the present method fuses the global context features with convolutional features in the first two convolutional layers.

The detailed implementation includes the following steps:

Step 1: Initializing the parameters in the overall network so that the parameters satisfy a Gaussian distribution with a mean of 0 and a variance of 0.1;

Step 2: Denoting the original hyperspectral remote sensing image as $X \in R^{h \times w \times c}$ wherein h, w, and c are the height, width, and number of bands of the original hyperspectral remote sensing image, respectively. Inputting X into the first dilated convolutional layer with m 3×3 convolutional kernels, and calculating features $C_1=g(W_1*X+b_1)$ of the first dilated convolutional layer, wherein $W_1$, $b_1$ are the weight matrix and the bias vector in the first dilated convolutional layer, g (x)=max (0, x) is the rectified linear unit function. Similarly, the features of the second dilated convolutional layer and the third dilated convolutional layer are expressed as $C_2=g(W_2*C_1+b_2)$ and $C_3=g(W_3*P_1+b_3)$, wherein $P_1=P_{avg}(C_2)$ is the feature of the first pooling layer, and $P_{avg}(\cdot)$ is the 2×2 average pooling operation.

Step 3: Inputting the feature $C_3$ of the third dilated convolutional layer to the self-attention module to learn the self-attention feature $$S \in R^{\frac{h}{2} \times \frac{w}{2} \times m},$$

wherein m is the number of convolutional kernels in the first dilated convolutional layer;

Step 4: Inputting the self-attention feature S learned by the self-attention module to the context encoding module to learn context features $$Z \in R^{\frac{h}{2} \times \frac{w}{2} \times m};$$

Step 5: Concatenating the context feature Z with the first convolutional feature and the second convolutional feature for a feature fusion, and obtaining the fused features $H=[C_1;C_2;U(Z)] \in R^{h \times w \times 3m}$, wherein $U(\cdot)$ represents the bilinear interpolation with an upsampling rate of 2, $C_1$ and $C_2$ are features of the first dilated convolutional layer and the second dilated convolutional layer, respectively;

Step 6: Inputting the fused feature H into a 1×1 convolutional layer, and using the Softmax function to obtain the probability map $\hat{Y}$ predicted by the overall network. Calculating the cross-entropy loss function $L_{S_{cls}}$ between the predicted probability map $\hat{Y}$ and the ground-truth label Y:

$$L_{\underset{cls}{S}} = -\frac{1}{hw}\sum_{i=1}^{h}\sum_{j=1}^{w}\sum_{k=1}^{v}Y_{(i,j,k)}\log(\hat{Y}_{(i,j,k)}),$$

wherein v is the total number of categories, $\hat{Y}$ is the predicted probability map, and Y is the ground-truth label, wherein h and w are the height and width of the image, respectively;

Step 7: Using the gradient descent algorithm to optimize the loss function in step 6;

Step 8: Repeating the above steps 2-7 until the overall network converges;

Step 9: Inputting the target image into the trained overall network to complete the hyperspectral remote sensing image classification task.

Preferably, the detailed learning process of the self-attention feature S described in step 3 includes the following sub-steps:

Step 3.1: To reduce the computational burden in the self-attention feature learning process, using an 2×2 average pooling layer to halve the spatial size of the inputted feature $C_3$ of the third dilated convolutional layer:

$$P_2 = P_{avg}(C_3) \in R^{\frac{h}{4}\times\frac{w}{4}\times m};$$

Step 3.2: Inputting $P_2$ into three convolutional layers with n convolutional kernels to obtain the corresponding feature maps $$\{\alpha, \beta, \gamma\} \in R^{\frac{h}{4}\times\frac{w}{4}\times n};$$

Step 3.3: Resizing $\alpha, \beta, \gamma$ to $$R^{\frac{hw}{16}\times n},$$

and using the following formula to calculate the spatial attention map $$A \in R^{\frac{hw}{16}\times\frac{hw}{16}}:$$

$$A_{(i,j)} = \frac{\exp(\alpha_i \times \beta_j^T)}{\sum_{k=1}^{\frac{hw}{16}}\exp(\alpha_k \times \beta_j^T)},$$

wherein $A_{(i,j)}$ represents the influence of pixel i on pixel j in the original hyperspectral remote sensing image, k=1,2, . . . , hw/16;

Step 3.4: Performing matrix multiplication on the spatial attention map A and the feature map γ to obtain the feature map B=A×γ, and then resizing B to $$R^{\frac{h}{4}\times\frac{w}{4}\times n};$$

Step 3.5: Computing the final self-attention features $$S \in R^{\frac{h}{2}\times\frac{w}{2}\times m}$$

enhanced by the self-attention module via:

$S=F(U(B))+C_3,$ wherein F(·) represents a nonlinear mapping function, which is implemented by a convolutional layer with m convolutional kernels, and U(·) represents the bilinear interpolation with an upsampling rate of 2.

Preferably, the detailed learning process of the context feature Z described in step 4 includes the following sub-steps:

Step 4.1: Reducing the dimensionality of the inputted self-attention feature S with a 1×1 convolutional layer with n convolutional kernels, and resizing the obtained feature map Q to $$R^{\frac{hw}{4}\times n}$$

Denoting $q_i \in R^n$ as the i-th element in Q, wherein i=1, 2, . . . N, $$N = \frac{hw}{4};$$

Step 4.2: Denoting $D=\{d_j\}_{j=1}k$ as the coding dictionary that learns the visual center using the global statistical information in Q, wherein $d_j \in R^n$ represents the j-th element in the dictionary, and k is the number of elements in the dictionary. Calculating the standardized residual between Q and D via:

$$e_{ij} = \frac{\exp(-s_j\|r_{ij}\|^2)}{\sum_{l=1}^{k}\exp(-s_l\|r_{il}\|^2)}r_{ij},$$

wherein $r_{ij}=q_i-d_j$ represents the residual between the i-th element in Q and the j-th element in D, and $s_j$ represents the scaling factor corresponding to the j-th element in D, and $s_l$ represents the scaling factor corresponding to a l-th element in D;

Step 4.3: Calculating the global context vector $$e = \sum_{j=1}^{k}N\left(\sum_{i=1}^{N}e_{ij}\right) \in R^n,$$

wherein N (·) represents the batch normalization operation;

Step 4.4: Using a fully connected layer to upscale the global context vector e to $R^m$:

$\hat{e}=\sigma(W_{fc}e+b_{fc}),$ wherein $$\sigma(x) = \frac{1}{1+\exp(-x)}$$

is the sigmoid function, $W_{fc}$ and $b_{fc}$ are the weight matrix and the bias vector in the fully connected layer, respectively;

Step 4.5: Computing the final context features $$Z \in R^{\frac{h}{2}\times\frac{w}{2}\times m}:$$

$$Z = S \odot (\hat{e}+1),$$

wherein ⊙ represents the element-wise multiplication on the channel dimension.

The above are the detailed implementation steps of a hyperspectral remote sensing image classification method based on the self-attention context network involved in the present invention.

Due to the difference in data acquisition equipment, the pixel values of the collected hyperspectral remote sensing images often vary greatly, which may affect the classification performance. In order to avoid this problem, before step 1, the hyperspectral remote sensing image data should be standardized so that all pixel values are in the range of 0-1. This step will serve as a preprocessing step involved in the present invention.

Figure 2:
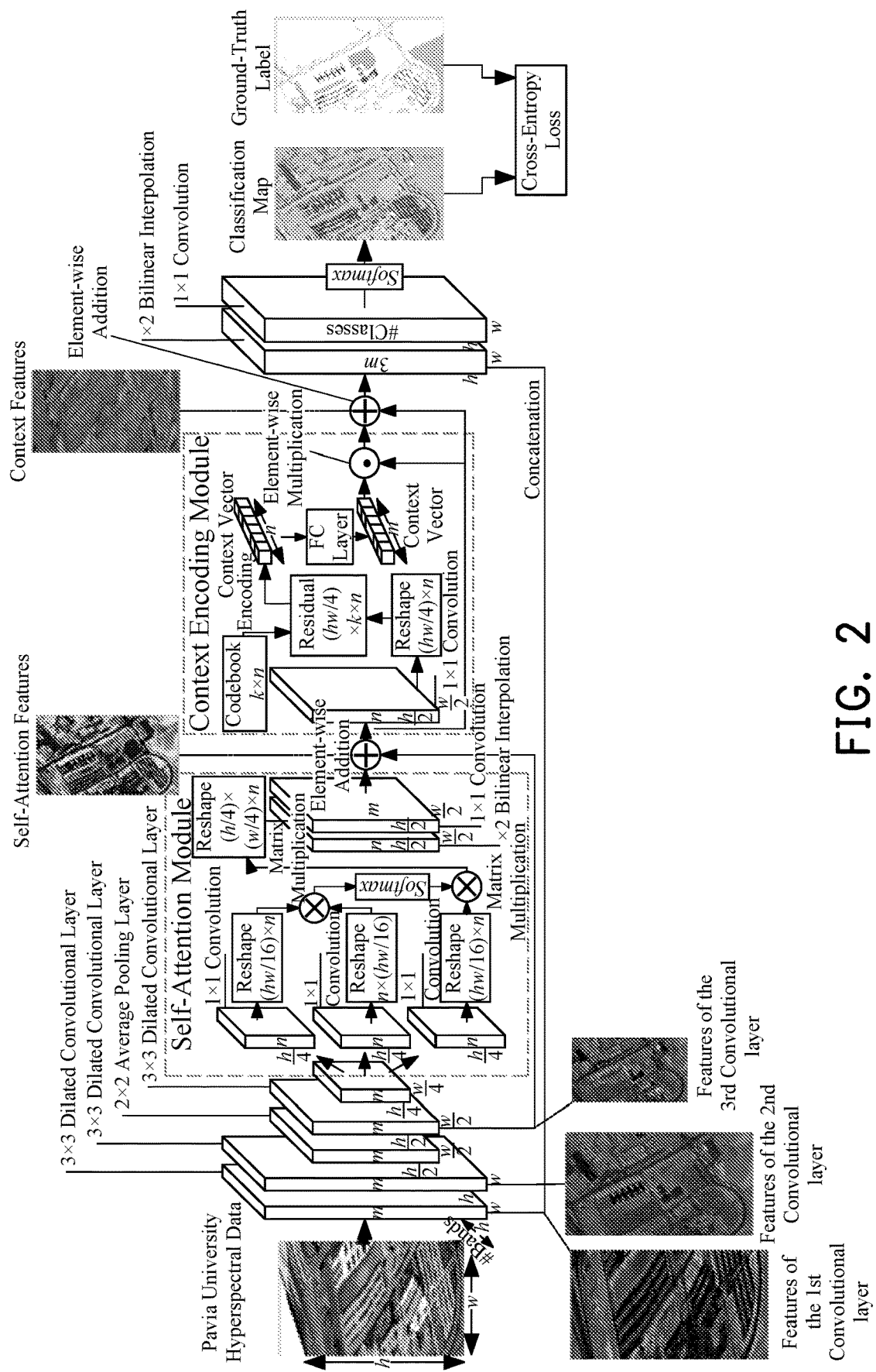
FIG. 2 is a schematic diagram of classifying the Pavia University hyperspectral remote sensing image using a self-attention context network proposed by the present invention.

FIG. 2 is a schematic diagram of classifying the Pavia University hyperspectral remote sensing image using a self-attention context network proposed by the present invention. This hyperspectral remote sensing image was collected at the University of Pavia area in northern Italy using the Reflective Optics System Imaging Spectrometer (ROSIS) sensor. The image contains 103 available spectral bands, and covers the spectral range from 430 nm to 860 nm. The image size is 610×340 pixels and with a spatial resolution of 1.3 meters. A detailed description of the embodiments on the Pavia University hyperspectral remote sensing image is given below.

First, reading the Pavia University hyperspectral remote sensing image into the memory, and standardizing it so that all pixel values are in the range of 0-1; Initializing the parameters in the overall network according to the method described in step 1, so that the parameters are under a Gaussian distribution with a mean of 0 and a variance of 0.1; Based on the method described in step 2, calculating the convolutional features of the first dilated convolutional layer, the second dilated convolutional layer, and third dilated convolutional layer; Based on the method described in step 3, inputting the convolutional features of the third dilated convolutional layer to the self-attention module, and learn the self-attention feature; Based on the method described in step 4, inputting the learned self-attention feature to the context encoding module and learn context features; Based on the method described in step 5, concatenating the context features with the convolutional features obtained by the first dilated convolutional layer and the second convolutional layer to obtain the fused features; Based on the method described in step 6, inputting the fused features into a convolutional layer, using the Softmax function to obtain the probability map predicted by the overall network, and calculating the cross-entropy loss function between the predicted probability map and the ground-truth label; Based on the method described in step 7, using the gradient descent algorithm to optimize the cross-entropy loss function; Repeating the above steps 2-7 until the network converges (such as after 1000 iterations); Finally, inputting the target hyperspectral remote sensing image to the trained network to conduct hyperspectral remote sensing image classification.

The method of the present invention could be executed by an electronic equipment in practical implementations, wherein the electronic equipment comprises:

(1) Processor: The processor may be a central processing unit (CPU) or other forms of processing units (such as a graphics processing unit, GPU) capable of data processing and instruction execution, and may control other components in the above-mentioned electronic devices to perform desired functions.

(2) Memory: The memory may include one or more computer program products, which may include various forms of computer-readable storage media, such as volatile memory and/or non-volatile memory. The volatile memory may include, for example, random access memory (RAM) and/or cache memory (cache). The non-volatile memory may include a read-only memory (ROM), a hard disk, and a flash memory. Hyperspectral remote sensing images to be processed and computer program instructions related to the method can be stored in the memory. When the computer program instructions are executed by the processor, the processor performs the hyperspectral remote sensing image processing operations described in any one of steps 1-9 of the present invention, to realize the hyperspectral remote sensing image classification method described in this invention. Various contents such as the cross-entropy loss value, context features, etc. may also be stored in the computer-readable storage media.

It should be understood that the parts not described in detail in this specification belong to the prior art.

It should be understood that the above-mentioned descriptions for the preferred embodiments are relatively detailed, and should not be considered as limiting the scope of the patent protection of the present invention. Within the scope of protection, replacements or modifications can also be made, all of which fall within the protection scope of the present invention, and the scope of protection of the present invention should be based on the appended claims.

What is claimed is:

1. A hyperspectral remote sensing image classification method based on a self-attention context network, comprising: first, constructing an overall network, including a backbone network, a self-attention module, and a context encoding module, and extracting hierarchical features through three dilated convolutional layers and an average pooling layer by the backbone network; then, inputting the features extracted by the backbone network to the self-attention module for a self-attention learning, and constructing a spatial dependency between pixels to obtain a self-attention feature; finally, inputting the self-attention feature to the context encoding module to learn global context features; a detailed implementation includes following steps:

step 1: initializing parameters in the overall network so that the parameters satisfy a Gaussian distribution with a mean of 0 and a variance of 0.1;

step 2: denoting an original hyperspectral remote sensing image as $X \in R^{h \times w \times c}$, wherein h, w, and c are a height, a width, and a number of bands of the original hyperspectral remote sensing image, respectively, and inputting X into the backbone network;

step 3: inputting a feature $C_3$ of a third dilated convolutional layer to the self-attention module to learn the self-attention feature $$S \in R^{\frac{h}{2} \times \frac{w}{2} \times m},$$

wherein m is a number of convolutional kernels in a first dilated convolutional layer;

step 4: inputting the self-attention feature S learned by the self-attention module to the context encoding module to learn context features $$Z \in R^{\frac{h}{2} \times \frac{w}{2} \times m};$$

step 5: concatenating the context features Z with a first convolutional feature and a second convolutional feature for a feature fusion, and obtaining fused features $H=[C_1;C_2;U(Z)] \in R^{h \times w \times 3m}$, wherein $U(\cdot)$ represents a bilinear interpolation with an upsampling rate of 2, $C_1$, and $C_2$ are features of the first dilated convolutional layer and a second dilated convolutional layer, respectively;

step 6: inputting the fused feature H into a convolutional layer, using a Softmax function to obtain a probability map $\hat{Y}$ predicted by the overall network, and calculating a cross-entropy loss function between the predicted probability map $\hat{Y}$ and a ground-truth label Y;

step 7: using a gradient descent algorithm to optimize the loss function in step 6;

step 8: repeating the above steps 2-7 until the overall network converges;

step 9: inputting a target image into the trained overall network to complete a hyperspectral remote sensing image classification task.

2. The hyperspectral remote sensing image classification method based on a self-attention context network according to claim 1, wherein, a detailed learning process of the self-attention feature S described in step 3 includes following sub-steps:

step 3.1: to reduce a computational burden in a self-attention feature learning process, using the average pooling layer to halve a spatial size of the inputted feature $C_3$ of the third dilated convolutional layer:

$$P_2 = P_{avg}(C_3) \in R^{\frac{h}{4} \times \frac{w}{4} \times m},$$

wherein $P_{avg}(\cdot)$ denotes an average pooling operation;

step 3.2: inputting $P_2$ into three convolutional layers with n convolutional kernels to obtain corresponding feature maps $$\{\alpha, \beta, \gamma\} \in R^{\frac{h}{4} \times \frac{w}{4} \times n};$$

step 3.3: resizing $\alpha$, $\beta$, $\gamma$ to $$R^{\frac{hw}{16} \times n},$$

and using following formula to calculate a spatial attention map $$A \in R^{\frac{hw}{16} \times \frac{hw}{16}}:$$

$$A_{(i,j)} = \frac{\exp(\alpha_i \times \beta_j^T)}{\sum_{k=1}^{\frac{hw}{16}} \exp(\alpha_k \times \beta_j^T)},$$

wherein $A_{(i,j)}$ represents an influence of pixel i on pixel j in the original hyperspectral remote sensing image, k=1,2, ..., hw/16;

step 3.4: performing a matrix multiplication on the spatial attention map A and the feature map $\gamma$ to obtain the feature map $B = A \times \gamma$, and then resizing B to $$R^{\frac{h}{4} \times \frac{w}{4} \times n};$$

step 3.5: computing the final self-attention feature $$S \in R^{\frac{h}{2} \times \frac{w}{2} \times m}$$

enhanced by the self-attention module via:

$$S = F(U(B)) + C_3,$$

wherein $F(\cdot)$ represents a nonlinear mapping function, which is implemented by a convolutional layer with m convolutional kernels, and $U(\cdot)$ represents the bilinear interpolation with the upsampling rate of 2.

3. The hyperspectral remote sensing image classification method based on a self-attention context network according to claim 1, wherein a detailed learning process of the context features Z described in step 4 includes following sub-steps:

step 4.1: reducing a dimensionality of the inputted self-attention feature S with a convolutional layer with n convolutional kernels, resizing an obtained feature map Q to $$R^{\frac{hw}{4} \times n},$$

and denoting $q_i \in R^n$ as an i-th element in Q, wherein i=1, 2, . . . N, $$N = \frac{hw}{4};$$

step 4.2: denoting $D = \{d_j\}_{j=1}^{k}$ as a coding dictionary that learns a visual center using global statistical information in Q, wherein $d_j \in R^n$ represents a j-th element in the dictionary, k is a number of elements in the dictionary, and calculating a standardized residual between Q and D via:

$$e_{ij} = \frac{\exp(-s_j\|r_{ij}\|^2)}{\sum_{l=1}^{k}\exp(-s_l\|r_{il}\|^2)} r_{ij},$$

wherein $r_{ij}=q_i-d_j$ represents a residual between the i-th element in Q and the j-th element in D, $s_j$ represents a scaling factor corresponding to the j-th element in D, and $s_l$ represents the scaling factor corresponding to a l-th element in D;

step 4.3: calculating a global context vector $$e = \sum_{j=1}^{k} N\left(\sum_{i=1}^{N} e_{ij}\right) \in R^n,$$

wherein N (·) represents a batch normalization operation;

step 4.4: using a fully connected layer to upscale the global context vector e to $R^m$:

$$\hat{e}=\sigma(W_{fc}+b_{fc}),$$

wherein σ

$$(x) = \frac{1}{1+\exp(-x)}$$

is a sigmoid function, $W_{fc}$ and $b_{fc}$ are a weight matrix and a bias vector in the fully connected layer, respectively;

step 4.5: computing the final context features $$Z \in R^{\frac{h}{2} \times \frac{w}{2} \times m}:$$

$$Z=S\odot(\hat{e}+1),$$

wherein ⊙ represents an element-wise multiplication on a channel dimension.

4. The hyperspectral remote sensing image classification method based on a self-attention context network according to claim 1, wherein a detailed implementation of inputting X into the backbone network in step 2 is as follows:

inputting X into the first dilated convolutional layer with m3×3 convolutional kernels, and calculating features $C_1=g(W_1*X+b_1)$ of the first dilated convolutional layer, wherein $W_1$ and $b_1$ are a weight matrix and a bias vector in the first dilated convolutional layer, respectively, g(x)=max(0,x) is a rectified linear unit function; similarly, features of the second dilated convolutional layer and the third dilated convolutional layer are expressed as $C_2=g(W_2*C_1+b_2)$ and $C_3=g(W_3*P_1+b_3)$, wherein $P_1=P_{avg}(C_2)$ is a feature of a first pooling layer, and $P_{avg}(\cdot)$ is an 2×2 average pooling operation.

5. The hyperspectral remote sensing image classification method based on a self-attention context network according to claim 1, wherein a detailed expression of the cross-entropy loss function in step 6 is as follows:

$$Ls_{cls} = -\frac{1}{hw}\sum_{i=1}^{h}\sum_{j=1}^{w}\sum_{k=1}^{v} Y_{(i,j,k)}\log(\hat{Y}_{(i,j,k)}),$$

wherein v is a total number of categories, $\hat{Y}$ is the predicted probability map, and Y is the ground-truth label, wherein h and w are the height and width of the original hyperspectral remote sensing image, respectively.

\* \* \* \* \*